US010892894B2

(12) United States Patent
Baughman et al.

(10) Patent No.: US 10,892,894 B2
(45) Date of Patent: *Jan. 12, 2021

(54) IDENTITY VERIFICATION USING BIOMETRIC DATA AND NON-INVERTIBLE FUNCTIONS VIA A BLOCKCHAIN

(71) Applicant: INTERNATIONAL BUSINESS MACHINES CORPORATION, Armonk, NY (US)

(72) Inventors: Aaron K. Baughman, Cary, NC (US); Charles E. Beller, Baltimore, MD (US); Sean M. Fuoco, New York, NY (US); Chennakesavalu Govindasamy, Schaumburg, IL (US); Palani Sakthi, Palatine, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/821,651

(22) Filed: Mar. 17, 2020

(65) Prior Publication Data
US 2020/0220721 A1   Jul. 9, 2020

Related U.S. Application Data

(63) Continuation of application No. 15/688,042, filed on Aug. 28, 2017, now Pat. No. 10,637,662.

(51) Int. Cl.
*H04L 9/08* (2006.01)
*H04L 9/06* (2006.01)
(Continued)

(52) U.S. Cl.
CPC ............ *H04L 9/0866* (2013.01); *G06F 21/32* (2013.01); *G06F 21/33* (2013.01); *G06F 21/602* (2013.01);
(Continued)

(58) Field of Classification Search
CPC ..... H04L 9/0618; H04L 9/0866; G06F 21/32; G06F 21/6245
See application file for complete search history.

(56) References Cited

U.S. PATENT DOCUMENTS 6,434,662 B1   8/2002   Greene et al.
6,836,554 B1   12/2004   Bolle et al.
(Continued)

FOREIGN PATENT DOCUMENTS

CN   103929425   7/2014
CN   107004077   8/2017
(Continued)

OTHER PUBLICATIONS

M. Jeong, J. Choi and J. Kim, "Using Genetic Algorithms to Improve Matching Performance of Changeable biometrics from Combining PCA and ICA Methods," 2007 IEEE Conference on Computer Vision and Pattern Recognition, Minneapolis, MN, 2007, pp. 1-5. (Year: 2007).*

(Continued)

*Primary Examiner* — Kari L Schmidt
(74) *Attorney, Agent, or Firm* — James Nock; Andrew D. Wright; Roberts Calderon Safran & Cole, P.C.

(57) ABSTRACT

A computer-implemented method comprising: receiving, by a computing device, biometrics data of a user via a user device as part of a request to access a secure device; applying, by the computing device, a non-invertible function to the biometrics data to scramble the biometrics data; determining, by the computing device, whether the scrambled biometrics data matches a pre-registered version of the scrambled biometrics data; and providing, by the computing device, an authentication message to the secure device requesting authentication of the user based on determining that the scrambled biometrics data matches the pre-registered version of the scrambled biometrics data, (Continued)

wherein the providing the authentication message provides a user of the user device with access to the secure device.

20 Claims, 12 Drawing Sheets

(51) Int. Cl.
      *G06F 21/32*    (2013.01)
      *G06F 21/33*    (2013.01)
      *G06F 21/60*    (2013.01)
      *H04L 9/32*     (2006.01)
      *G06F 21/62*    (2013.01)

(52) U.S. Cl.
      CPC ........ *G06F 21/6245* (2013.01); *H04L 9/0618* (2013.01); *H04L 9/3231* (2013.01); *H04L 9/3239* (2013.01); *G06F 2221/2107* (2013.01); *H04L 2209/38* (2013.01)

(56) References Cited

U.S. PATENT DOCUMENTS

| | | |
|---|---|---|
| 7,702,919 B2 | 4/2010 | Jonas |
| 8,412,928 B1 | 4/2013 | Bowness |
| 9,430,629 B1 | 8/2016 | Ziraknejad et al. |
| 9,509,690 B2 | 11/2016 | Carter |
| 9,516,035 B1 | 12/2016 | Moritz et al. |
| 9,985,964 B2 | 5/2018 | Andrade |
| 10,204,384 B2* | 2/2019 | Mehta .................. G06Q 50/01 |
| 10,255,600 B2 | 4/2019 | Ronca et al. |
| 10,291,624 B1* | 5/2019 | Cronin .................. H04W 12/06 |
| 2004/0255168 A1 | 12/2004 | Murashita et al. |
| 2005/0018883 A1 | 1/2005 | Scott |
| 2006/0078171 A1 | 4/2006 | Govindaraju et al. |
| 2006/0235729 A1 | 10/2006 | Braithwaite et al. |
| 2006/0288233 A1 | 12/2006 | Kozlay |
| 2008/0101658 A1 | 5/2008 | Ahem et al. |
| 2008/0155269 A1 | 6/2008 | Yoshikawa |
| 2010/0050253 A1 | 2/2010 | Baughman et al. |
| 2011/0162067 A1 | 6/2011 | Shuart et al. |
| 2013/0060642 A1 | 3/2013 | Shlomot |
| 2013/0127980 A1 | 5/2013 | Haddick et al. |
| 2013/0219193 A1 | 8/2013 | Baughman et al. |
| 2013/0227651 A1 | 8/2013 | Schultz et al. |
| 2014/0257833 A1 | 9/2014 | Williams |
| 2014/0344062 A1 | 11/2014 | Lamont |
| 2015/0096002 A1 | 4/2015 | Shuart et al. |
| 2015/0163219 A1 | 6/2015 | Lo et al. |
| 2015/0170112 A1 | 6/2015 | Decastro |
| 2015/0220918 A1 | 8/2015 | Davis et al. |
| 2015/0242605 A1 | 8/2015 | Du et al. |
| 2015/0278820 A1 | 10/2015 | Meadows |
| 2016/0012424 A1 | 1/2016 | Simon et al. |
| 2016/0162897 A1 | 6/2016 | Feeney |
| 2016/0321654 A1 | 11/2016 | Lesavich et al. |
| 2017/0070495 A1* | 3/2017 | Cherry ................ G06F 21/6209 |
| 2017/0140141 A1 | 5/2017 | Yan et al. |
| 2017/0230363 A1 | 8/2017 | Deutschmann et al. |
| 2017/0242995 A1 | 8/2017 | Bassenye-Mukasa et al. |
| 2017/0257358 A1 | 9/2017 | Ebrahimi et al. |
| 2017/0316497 A1 | 11/2017 | Song et al. |
| 2018/0012009 A1 | 1/2018 | Furman et al. |
| 2018/0012227 A1 | 1/2018 | Tunnell et al. |
| 2018/0075481 A1 | 3/2018 | Adoni et al. |
| 2018/0117446 A1 | 5/2018 | Tran et al. |
| 2018/0129957 A1 | 5/2018 | Saxena et al. |
| 2018/0176216 A1* | 6/2018 | Mather .................. H04L 63/0861 |
| 2018/0365920 A1 | 12/2018 | Daly et al. |
| 2019/0058593 A1 | 2/2019 | Polcha et al. |

FOREIGN PATENT DOCUMENTS

| | | |
|---|---|---|
| GB | 2528486 | 1/2016 |
| WO | 2015183497 | 12/2015 |

OTHER PUBLICATIONS

Simske, Steven J. "Dynamic biometrics: The case for a real-time solution to the problem of access control, privacy and security." 2009 First IEEE International Conference on Biometrics, Identity and Security (BIdS). IEEE, 2009, pp. 1-10. (Year: 2009).*
Torres, Wilson Abel Alberto, Nandita Bhattacharjee, and Bala Srinivasan. "Effectiveness of fully homomorphic encryption to preserve the privacy of biometric data." Proceedings of the 16th International Conference on Information Integration and Web-based Applications & Services. 2014, pp. 152-158. (Year: 2014).*
Mell et al., "The NIST Definition of Cloud Computing", NIST, Special Publication 800-145, Sep. 2011, 7 pages.
Lewison et al., "Backing Rich Credentials with a Blockchain PKI", Oct. 24, 2016, 19 pages.
Abrams et al., "Duality blockchain solutions", whitepaper v0 .1, Nov. 9, 2016, 17 pages.
Reichert, "Telstra explores blockchain, biometrics to secure smart home IoT devices", ZDNet, Sep. 22, 2016, 5 pages.
Decker et al., "Bitcoin meets strong consistency", ACM, ICDCN '16: Proceedings of the 17th International Conference on Distributed Computing and Networking, Jan. 4, 2016, 11 pages.
Maxwell et al., "Effing' the Ineffable: Opening up Understandings of the Blockchain", British HCI '15: Proceedings of the 2015 British HCI Conference, Jul. 2015, 2 pages.
Koh et al. "Modeling and Simulation of Pedestrian Behaviors in Crowded Places", Nanyang Technological University, ACM Transactions on Modeling and Computer Simulation, vol. 21, No. 3, Article 20, Mar. 2011, 23 pages.
Shi et al., "Biomapping: Privacy Trustworthy Biometrics Using Noninvertible and Discriminable Constructions", IEEE, 2008, 4 pages.
Nagar et al., "On the Security of Non-Invertible Fingerprint Template Transforms", IEEE, 2009, 5 pages.
Ratha et al., "Generating Cancelable Fingerprint Templates", IEEE Transactions on Pattern Analysis Machine Intelligence vol. 29, No. 4, Apr. 2007, 12 pages.
Search Report and Written Opinion of the International Search Authority in PCT/182017/058101 dated May 30, 2018, 11 pages.
Bakshi, Sambit, and Tugkan Tuglular. "Security through human-factors and biometrics." Proceedings of the 6th International Conference on Security of Information and Networks, pp. 463-463. ACM, 2013. (Year 2013).
Greenstadt, Rachel, and Jacob Beal. "Cognitive security for personal devices." Proceedings of the 1st ACM workshop on Workshop on AISec, pp. 27-30. ACM, 2008. (Year: 2008).
N. Pokhriyal, K. Tayal, I. Nwogu and V. Govindaraju, "Cognitive-Biometric Recognition From Language Usage: A Feasibility Study," in IEEE Transactions on Information Forensics and Security, vol. 12, No. 1, pp. 134-143, Jan. 2017. (Year: 2017).
R. Zhang, Y. Hao, W. Zhang, Q. Han and Z. Lu, "Multi-Biometric Feature Identification Technologies based on Visual Perception and Cognitive Mechanism," 2008 International Conference on Apperceiving Computing and Intelligence Analysis, Chengdu, 2008, pp. 232-235. (Year: 2008).
List of IBM Patents or Patent Applications Treated as Related, dated Mar. 17, 2020, 1 page.

* cited by examiner

IDENTITY VERIFICATION USING BIOMETRIC DATA AND NON-INVERTIBLE FUNCTIONS VIA A BLOCKCHAIN

BACKGROUND

The present invention generally relates to identity verification using biometrics data and, more particularly, to identity verification using biometrics data and non-invertible functions via a blockchain.

Identity verification (e.g., for the purposes of granting an individual with access to assets), is often achieved using biometrics data (e.g., computer scans of the individual's biometrics, such as retina scans, finger print scans, voice scans, etc.). Biometrics data may be compared with pre-registered biometrics data for the individual, and access may be granted when scanned biometrics data matches the pre-registered biometrics data.

Storing of pre-registered biometrics data can be problematic, in that if an authentication server storing the pre-registered biometrics data is accessed by a malicious party, the malicious party may be able to use the pre-registered biometrics data to access assets for which they are not authorized. As such, substantial financial loss, identity theft, and/or other losses may occur from insecure identity verification techniques that rely on biometrics data.

The frequency and cost of security breaches continues to increase as sites that contain sensitive, personally identifiable, and payment information increase in volume and traffic. Additional layers in client-side authentication may be implemented, yet these additional layers have are often insufficient in preventing costly security attacks. Multi-layer client authentication can be burdensome to users, who are would need remember more and more credentials, and would need to change these credentials periodically (e.g., every few months). Additionally, multi-layer client authentication still fails to limit tactics used by attackers (e.g., from identifying client-side vulnerabilities, to the spread of crimeware and other types of attacks/breaches).

SUMMARY

In an aspect of the invention, a computer-implemented method includes: receiving, by a computing device, biometrics data of a user via a user device as part of a request to access a secure device; applying, by the computing device, a non-invertible function to the biometrics data to scramble the biometrics data; determining, by the computing device, whether the scrambled biometrics data matches a pre-registered version of the scrambled biometrics data; and providing, by the computing device, an authentication message to the secure device requesting authentication of the user based on determining that the scrambled biometrics data matches the pre-registered version of the scrambled biometrics data, wherein the providing the authentication message provides a user of the user device with access to the secure device. The computer-implemented method may also include, determining cognitive state data associated with the user; and applying the non-invertible function to cognitive state data based on determining the cognitive state data, wherein the scrambled biometrics data includes the cognitive state data after the non-invertible function has been applied to the cognitive state data. Advantageously, aspects of the present invention may improve user authentication and fraud detection by storing scrambled biometrics data instead of raw biometrics data, and may combine user authentication with cognitive state data.

In an aspect of the invention, there is a computer program product for authenticating a user to access a secure device. The computer program product comprising a computer readable storage medium having program instructions embodied therewith, the program instructions executable by a computing device to cause the computing device to: receive registration biometrics data of the user via a user device as part of a registration request; apply a non-invertible function to the registration biometric data to scramble the registration biometrics data and form a pre-registered version of the scrambled biometrics data; store the pre-registered version of the scrambled biometrics data as a blockchain transaction; receive biometrics data of a user via the user device as part of a request to access a secure device; apply the non-invertible function to the biometrics data to scramble the biometrics data; determine whether the scrambled biometrics data matches a pre-registered version of the scrambled biometrics data by accessing the blockchain; and provide an authentication message to the secure device requesting authentication of the user based on determining that the scrambled biometrics data matches the pre-registered version of the scrambled biometrics data, wherein the providing the authentication message provides a user of the user device with access to the secure device. In embodiments, the blockchain may be maintained by a plurality of distributed authentication servers. Advantageously, aspects of the present invention may improve user authentication and fraud detection by storing scrambled biometrics data instead of raw biometrics data, and may store data in a distributed manner using the blockchain to prevent a single point of vulnerability.

In an aspect of the invention, a system comprises: a CPU, a computer readable memory and a computer readable storage medium associated with a computing device; program instructions to maintain a blockchain storing a pre-registered version of scrambled biometrics data for a user; program instructions to receive biometrics data of a user via a user device as part of a request to access a secure device; program instructions to scramble the biometrics data using a non-invertible function; program instructions to determine whether the scrambled biometrics data matches a pre-registered version of the scrambled biometrics data; and program instructions to provide an authentication message to the secure device requesting authentication of the user based on determining that the scrambled biometrics data matches the pre-registered version of the scrambled biometrics data, wherein the providing the authentication message provides a user of the user device with access to the secure device. The program instructions are stored on the computer readable storage medium for execution by the CPU via the computer readable memory. The system may further include program instructions to either deny access to the secure device or request additional authentication information based on determining that the scrambled biometrics data does not match the pre-registered version of the scrambled biometrics data. Advantageously, aspects of the present invention may improve user authentication and fraud detection by storing scrambled biometrics data instead of raw biometrics data, and may obtain additional authentication data when needed.

In an aspect of the invention, a system comprises: a CPU, a computer readable memory and a computer readable storage medium associated with a computing device; program instructions to receive biometrics data of a user via a user device; program instructions to scramble the biometrics data using a non-invertible function; and program instructions to provide an authentication message to a secure device requesting authentication of the user based on the scrambled biometrics data matching the pre-registered version of the scrambled biometrics data stored in a blockchain, wherein the providing the authentication message provides a user of the user device with access to the secure device. The program instructions are stored on the computer readable storage medium for execution by the CPU via the computer readable memory. The system of may further include program instructions to deny access to the secure device based on the scrambled biometrics not matching the pre-registered version of the scrambled biometrics data. The scrambling the biometrics data includes using a scrambling technique selected from the group consisting of: a Cartesian scrambling technique; a polar scrambling technique; and a surface folding scrambling technique.

In an aspect of the invention, there is a computer program product for authenticating a user to access a secure device, the computer program product comprising a computer readable storage medium having program instructions embodied therewith. The program instructions are executable by a computing device to cause the computing device to: receive registration biometrics data of the user via a user device as part of a registration request; determine a cognitive state of the user when receiving the registration biometrics data; select a non-invertible function from a plurality of non-invertible functions based on the cognitive state of the user; apply the non-invertible function to the registration biometrics data to scramble the registration biometrics data to form a pre-registered version of the scrambled biometrics data; store the pre-registered version of the scrambled biometrics data as a blockchain transaction; receive biometrics data of a user via the user device as part of a request to access a secure device; apply the non-invertible function to the biometrics data to scramble the biometrics data; determine whether the scrambled biometrics data matches the pre-registered version of the scrambled biometrics data by accessing the blockchain; and provide an authentication message to the secure device requesting authentication of the user based on determining that the scrambled biometrics data matches the pre-registered version of the scrambled biometrics data, wherein the providing the authentication message provides a user of the user device with access to the secure device. In a further aspect, the biometrics data is stored as a blockchain transaction.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
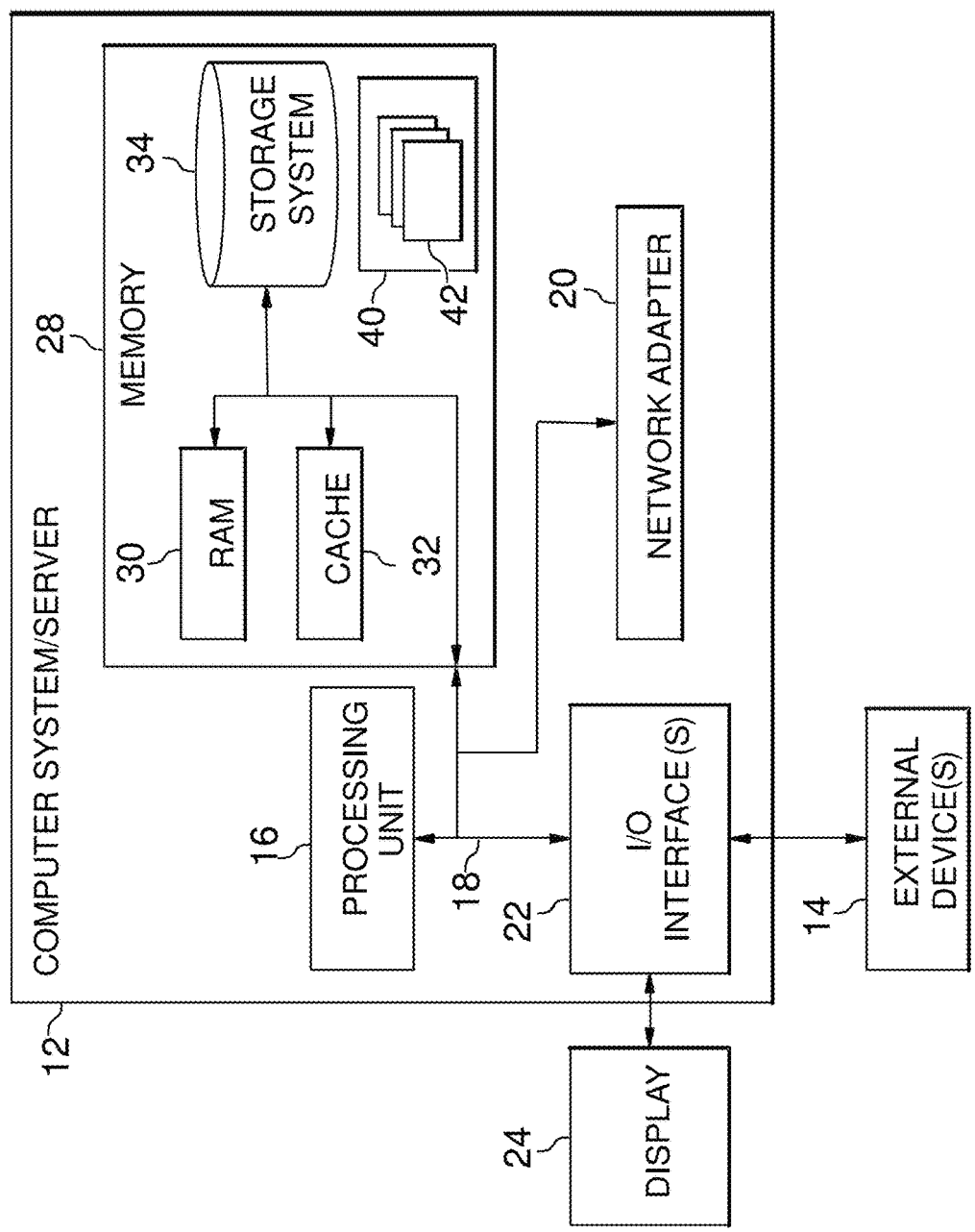
FIG. 1 depicts a cloud computing node according to an embodiment of the present invention.

The present invention generally relates to identity verification using biometrics data and, more particularly, to identity verification using biometrics data and non-invertible functions via a blockchain. Aspects of the present invention may verify or authenticate the identity of an individual by receiving biometrics data associated with the individual, scrambling the biometrics data using a non-invertible or scrambling function, and comparing the scrambled biometrics data with pre-registered scrambled biometrics data to determine whether the scrambled biometrics data matches the pre-registered scrambled biometrics data in order to authenticate the identity of the individual. In embodiments, aspects of the present invention may take into consideration other factors for identity verification. For example, cognitive state data may be used to verify the identity of the individual. In embodiments, the cognitive state data may include information indicating the current activity of the individual, historical patterns for the individual (e.g., historical shopping patterns, service accessing patterns, asset accessing patterns, etc.).

In embodiments, the cognitive state data may also be scrambled and combined with scrambled biometrics data for identifying the individual. Additionally, or alternatively, the cognitive state data may be used for selecting a particular non-invertible function to use when scrambling the biometrics data. As described herein, scrambled data may be compared with pre-registered scrambled data to authenticate an individual. Once the individual has been authenticated, access to an asset may be granted (e.g., access to financial server for accessing electronic funds, access to electronic information, a computer application, a physical asset such as a safe, repository of precious metals and/or other valuables, etc.).

Aspects of the present invention may use blockchain technology to share and publish registered and scrambled data so that distributed authentication servers may be used to authenticate or verify the identity of an individual. In this regard, a single authentication server may not be compromised in an attempt to access the scrambled data. Further, since no actual biometrics data is stored by an authentication server or a blockchain, it is not possible for a malicious party to access or steal the biometrics data associated with individuals. As a result, security in the authentication of individuals is vastly improved.

As described herein, when a user attempts to authenticate their identity, an authentication server may verify scrambled biometrics data, cognitive state data, and/or transaction data in the blockchain. In this way, user authentication may be more secure and is also less burdensome for the user since the user would not be required to remember different passwords for authentication to access different client servers. Additionally, the authentication server may classify the emotional or cognitive state for each blockchain transaction and associate the cognitive state with user experience on a client site hosted by a client server. In embodiments, noninvertible behavioral and biometrics data may be associated with each blockchain transaction. In this way, end-to-end data is captured for each transaction (e.g., user information, biometric and behavioral/cognitive state, client server information, etc.). As described herein, blockchain technology, along with non-invertible functions, may be used to encrypt and manage the linkage between biometrics data, cognitive state data, and client site data.

Aspects of the present invention may solve the technical problem of identity authentication by providing a technical solution that scrambles biometrics data with non-invertible functions. Additionally, or alternatively, aspects of the present invention provide a technical solution for verifying identity based on the cognitive state of an individual, using the cognitive state data to select a particular non-invertible function for scrambling the biometrics data, and using the cognitive state data in combination with the scrambled biometrics data to authenticate the identity of the individual. Additionally, or alternatively, aspects of the present invention provide a technical solution for improving the integrity of identity authentication by leveraging blockchain technology to securely share and distribute information used to authenticate the identity, thereby preventing a single authentication server from being vulnerable. Additionally, or alternatively, aspects of the present invention provide a technical solution for improving the integrity of identity authentication by storing only scrambled data rather than actual biometrics data. In embodiments, aspects of the present invention may improve fraud detection by combining biometrics data with cognitive state data for authenticating users.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
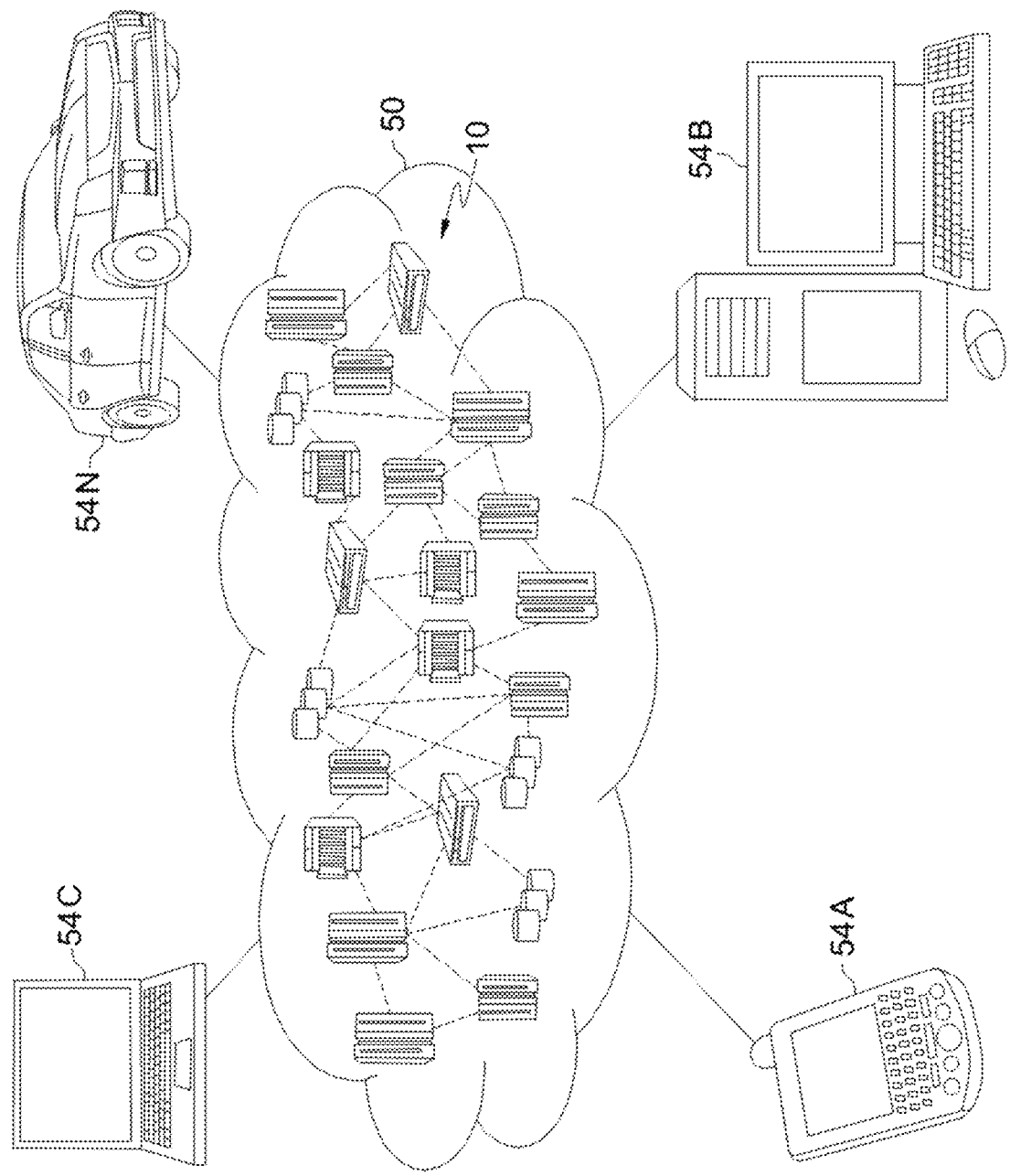
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
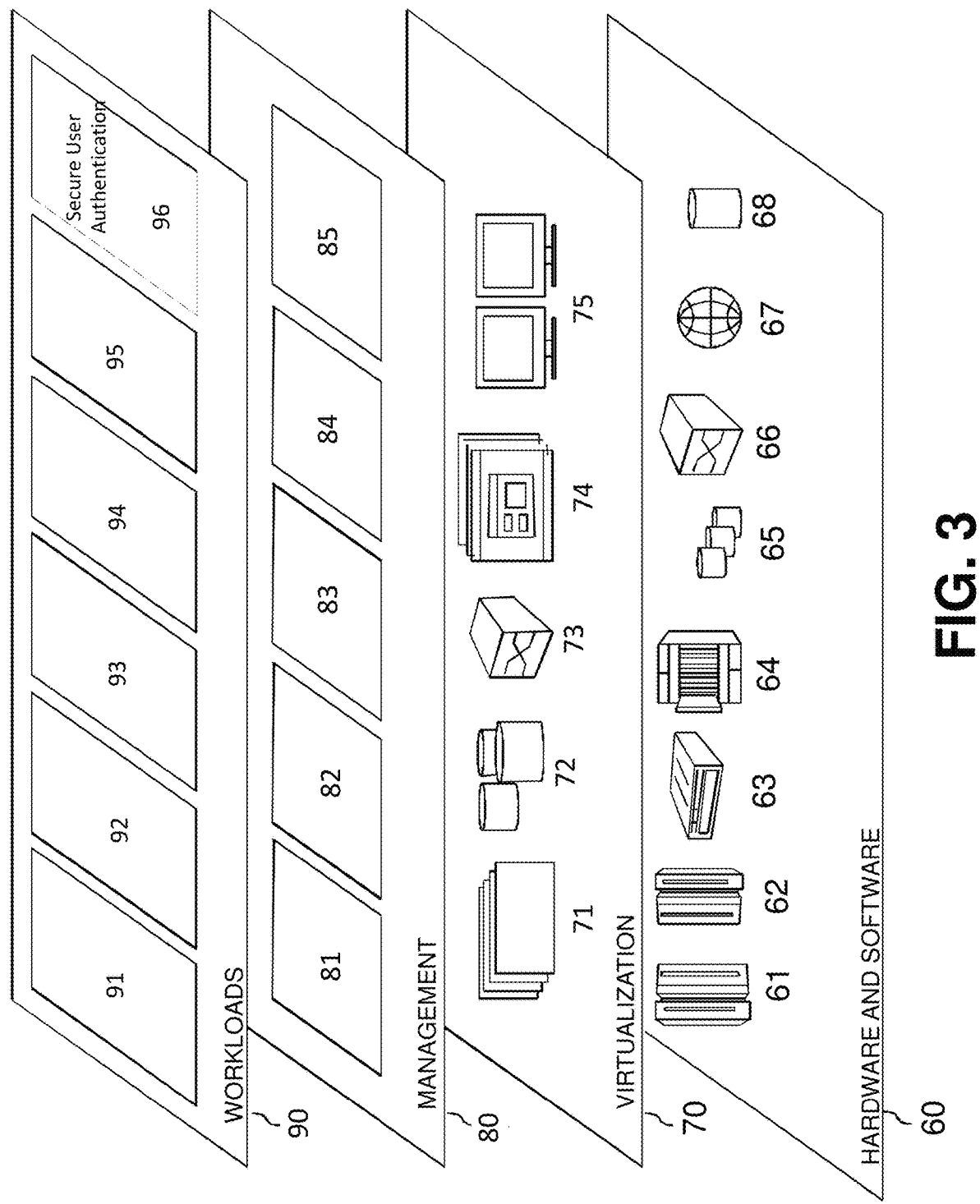
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure user authentication 96.

Referring back to FIG. 1, the program/utility 40 may include one or more program modules 42 that generally carry out the functions and/or methodologies of embodiments of the invention as described herein (e.g., such as the functionality provided by secure user authentication 96). Specifically, the program modules 42 may receive biometrics data associated with a user, determine the cognitive state of the user, apply a non-invertible function associated with the cognitive state to the biometrics data, match the scrambled data with stored scrambled data, and authenticate the user when the scrambled data and stored scrambled data match. Additionally, or alternatively, the program modules 42 may record authentication-related transactions in a blockchain, and access the blockchain to obtain the stored scrambled data. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of authentication servers shown FIG. 4A.

Figure 4A:
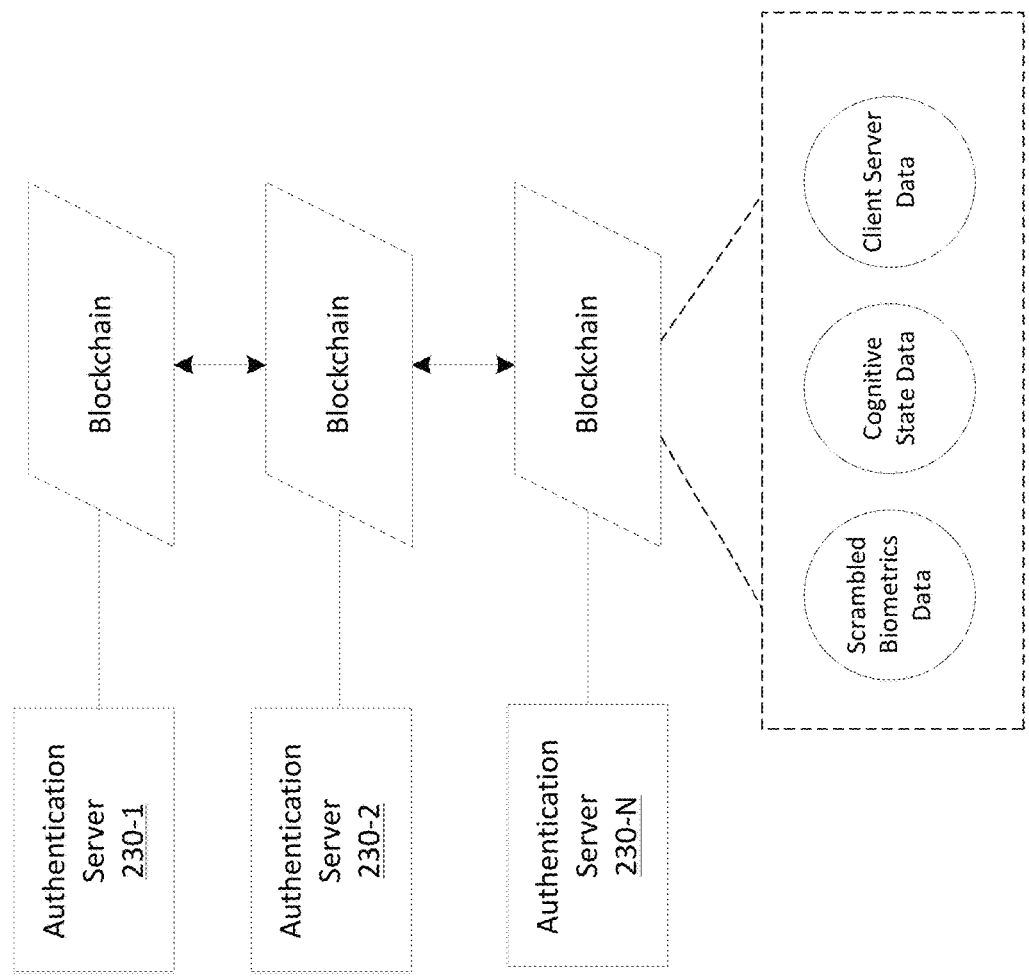
FIGS. 4A and 4B show an overview of an example implementation in accordance with aspects of the present invention.
Figure 4B:
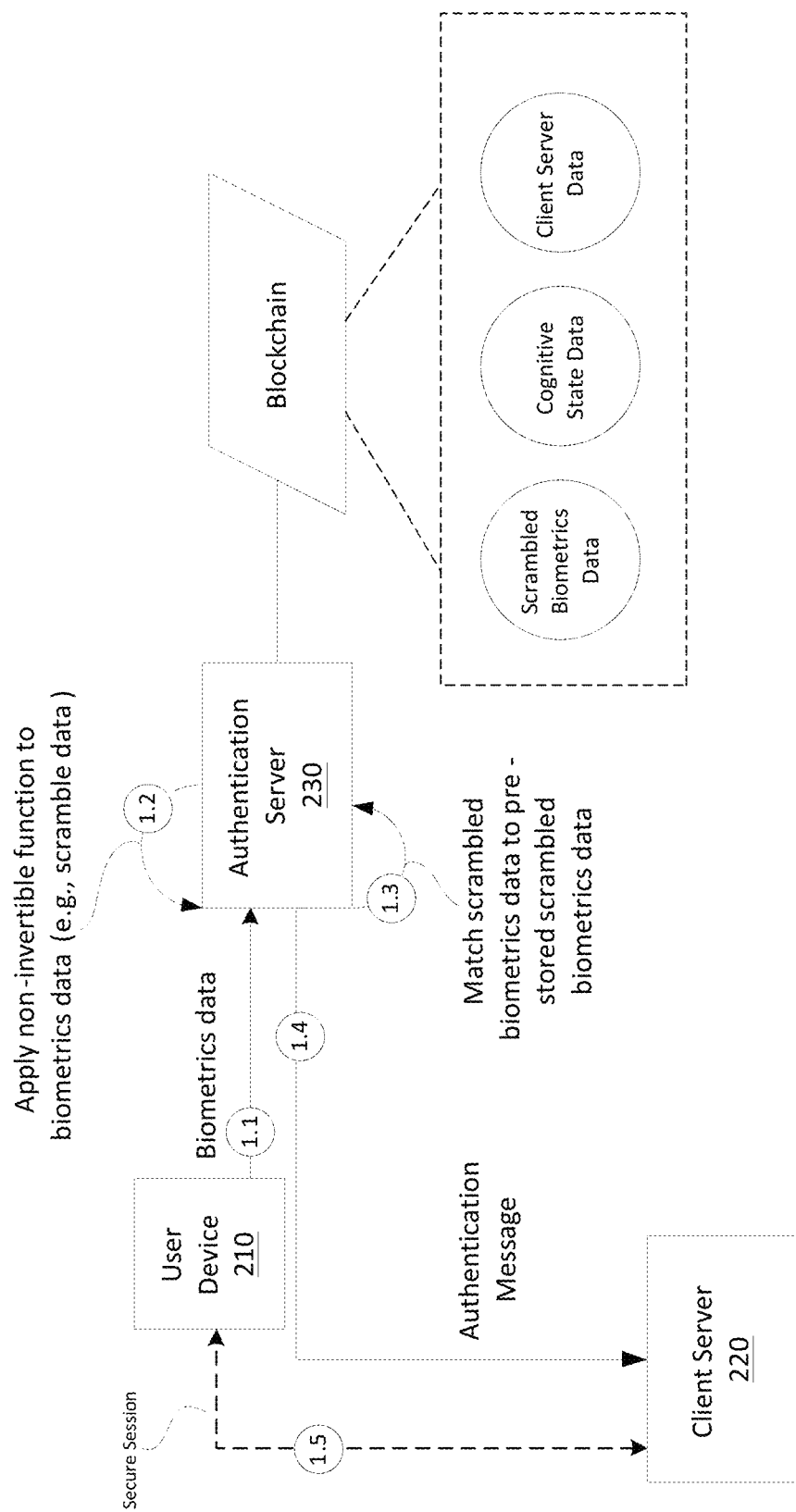

FIGS. 4A and 4B show an overview of an example implementation in accordance with aspects of the present invention. As shown in FIG. 4A, authentication servers 230-1 through 230-N may each maintain a blockchain having data that may be used for identity authentication, as described herein. For example, the blockchain may store transactions/records relating to scrambled biometrics data for a user, cognitive state data for the user, and data associated with a client server (e.g., a server for which access may be granted to an authorized user). As described herein, each authentication server 230 may be used to authenticate a user to access a client server. As such, use of the blockchain may improve security by allowing multiple authentication servers 230 to be used for authentication such that a single authentication server 230 may not be compromised. Further, use of the blockchain may allow data to be stored in a permanent and secure manner such that the data cannot be altered or modified by malicious parties.

Referring to FIG. 4B, an authentication server 230 may receive biometrics data (at step 1.1). For example, the authentication server 230 may receive the biometrics data from a user (e.g., via a user device 210, such as a smartphone, tablet, desktop/laptop computer, or the like). In embodiments, the authentication server 230 may receive the biometrics data as part of a request from the user to access a client server 220 or other secure device (e.g., secure computing device, physical device, such as a safe deposit box, etc.). For example, the client server 220 may request user authentication for the purposes of processing payment for an e-commerce transaction, permitting access to a secure directory, etc. In embodiments, the biometrics data may include a fingerprint scan, retina scan, facial scan, and/or other type of biometrics data. At step 1.2, the authentication server 230 may apply a non-invertible function to the biometrics data (e.g., to scramble the biometrics data). In embodiments, the authentication server 230 may scramble the biometrics data using one of multiple different non-invertible functions. As described herein, the authentication server 230 may determine a cognitive state of the user and may select one of the multiple different non-invertible functions with which to apply to the biometrics data. In embodiments, the authentication server 230 may determine the cognitive state based on the user's activity or interaction with the client server 220 (e.g., the user's shopping history when the client server 220 hosts an e-commerce page, the user's access history to secure files when the client server 220 hosts a secure file system, etc.).

At step 1.3, the authentication server 230 may match the scrambled biometrics data to pre-stored scrambled biometrics data associated with the user. If the two data sets match, the authentication server 230 may send an authentication message to the client server 220 (at step 1.4). Based on receiving the authentication message, the client server 220 may grant the user device 210 with access to the client server 220. For example, at step 1.5, the client server 220 may establish a secure session with the user device 210 based on receiving the authentication message. If the data sets do not match, the authentication server 230 may query the user (e.g., by sending a message to the user device 210) for additional authentication information, or may simply deny access to the client server 220 by refraining from sending the authentication message from the client server 220.

In embodiments, cognitive state data may be also be combined with the biometrics data and the combined data may be scrambled. Also, data regarding the client server 220 may be used to determine the cognitive state of the user. Additionally, or alternatively, data regarding the client server 220 may be combined with the biometrics data and the combined data may be scrambled and matched with pre-stored scrambled data for the user. As described herein, only scrambled data may be stored by the blockchain rather than any actual biometrics data. As such, biometrics data may not be compromised or stolen by malicious parties.

Figure 5:
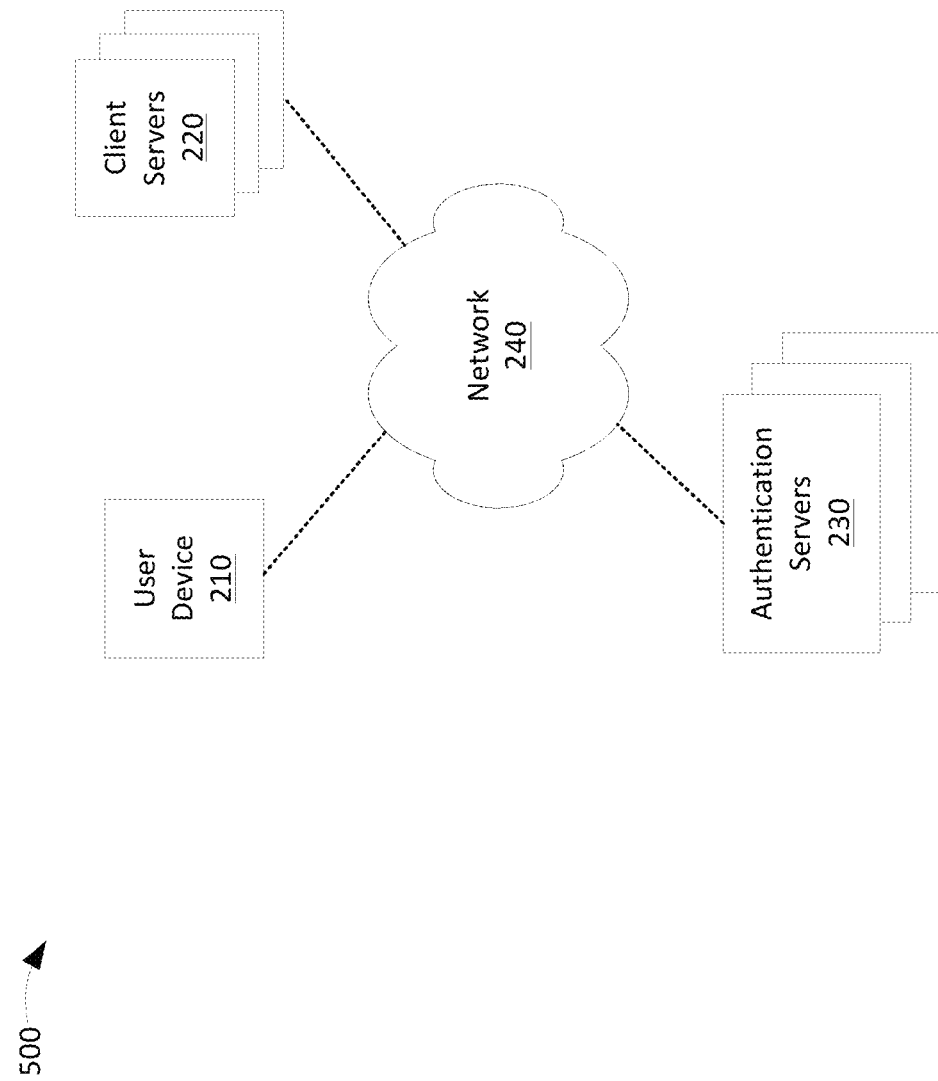
FIG. 5 shows an example environment in accordance with aspects of the present invention.

FIG. 5 shows an example environment in accordance with aspects of the present invention. As shown in FIG. 5, environment 500 may include a user device 210, client server 220, authentication servers 230, and network 240. In embodiments, one or more components in environment 500 may correspond to one or more components in the cloud computing environment of FIG. 2. In embodiments, one or more components in environment 500 may include the components of computer system/server 12 of FIG. 1.

The user device 210 may include a computing device capable of communicating via a network, such as the network 240. For example, the user device 210 may correspond to a mobile communication device (e.g., a smart phone or a personal digital assistant (PDA)), a portable computer device (e.g., a laptop or a tablet computer), a desktop computing device, or another type of computing device. In some embodiments, the user device 210 may request access to a client server 220, receive biometrics data, and provide the biometrics data to an authentication server 230. In embodiments, the user device 210 may simply be a biometrics collection device that provides biometrics data to the authentication server 230.

The client servers 220 may include one or more computing devices (e.g., such as computer system/server 12 of FIG. 1) that each host one or more secure applications and/or secure data. A client server 220 may receive a request for access from a user device 210, direct an authentication server 230 to authenticate a user of the user device 210, and receive an authentication message from the authentication server 230 when the authentication server 230 authenticates the user based on the processes described herein.

The authentication servers 230 may include distributed computing devices (e.g., such as computer system/servers 12 of FIG. 1) that may receive a request to authenticate a user from a client server 220. The authentication server 230 may authenticate a user based on biometrics data, data associated with a client server 220 for which access is being requested, and/or cognitive state data. In embodiments, each authentication server 230 may maintain a blockchain that stores pre-registered (e.g., previously registered and stored) scrambled biometrics data associated with a registered user. As described herein, the authentication server 230 may apply a non-invertible function to biometrics data to scramble the biometrics data, and compare the scrambled biometrics data to the pre-registered scrambled biometrics data. The authentication server 230 may provide an authentication message to the client server 220 when a match (to a configurable threshold degree) is identified between the scrambled biometrics data and the pre-registered scrambled biometrics data.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
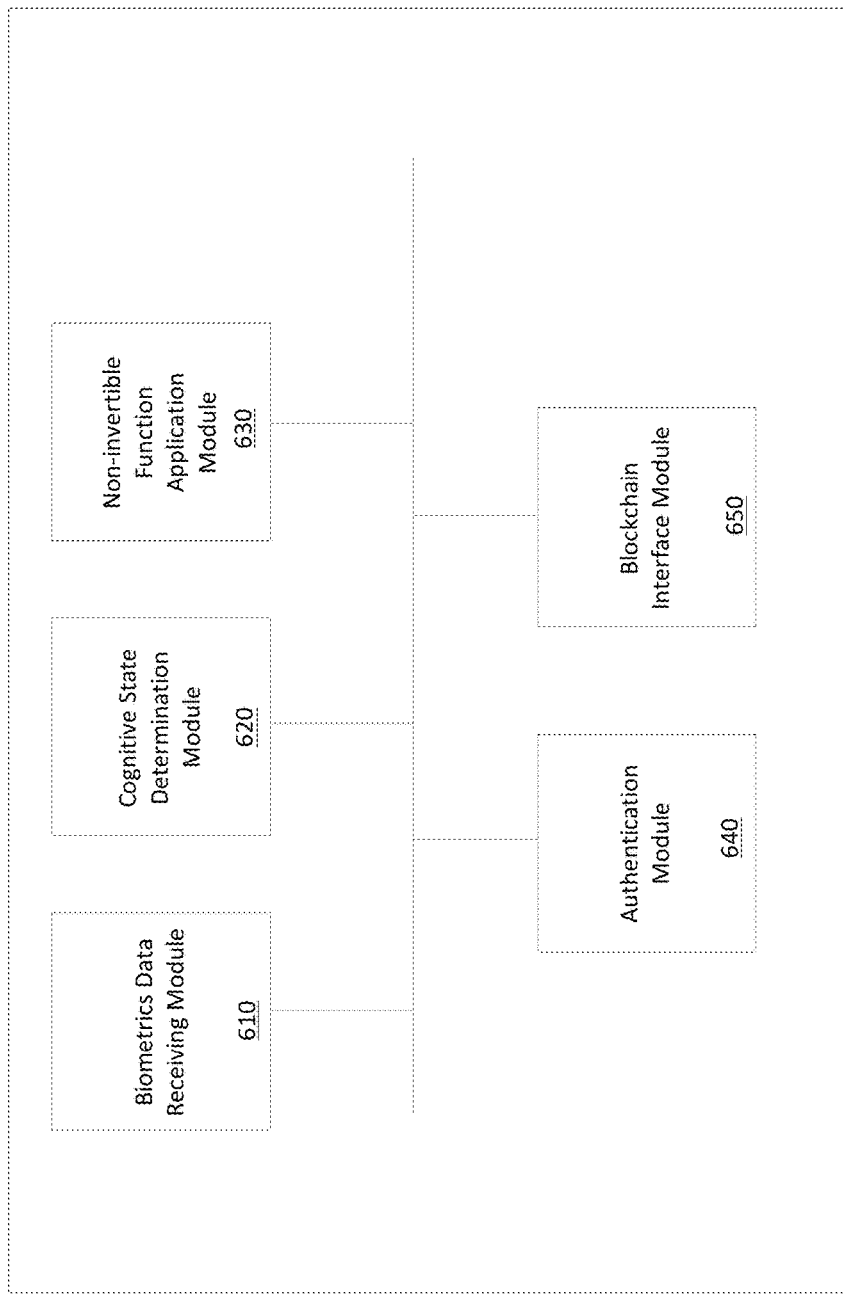
FIG. 6 shows a block diagram of example components of an authentication server in accordance with aspects of the present invention.

FIG. 6 shows a block diagram of example components of an authentication server in accordance with aspects of the present invention. As shown in FIG. 6, the, authentication server 230 may include a biometrics data receiving module 610, a cognitive state determination module 620, a non-invertible function application module 630, a authentication module 640, and a blockchain interface module 650. In embodiments, the authentication server 230 may include additional or fewer components than those shown in FIG. 6. In embodiments, separate components may be integrated into a single computing component or module. Additionally, or alternatively, a single component may be implemented as multiple computing components or modules.

The biometrics data receiving module 610 may include a program module (e.g., program module 42 of FIG. 1) that receives biometrics data (e.g., from a user device 210) in response to a request received from a client server 220 to authenticate a user associated with the user device 210. In embodiments, the biometrics data receiving module 610 may receive any combination of biometrics data, such as fingerprint data, handprint data, retina data, facial imaging data, pulse rate information, etc. In embodiments, the biometrics data receiving module 610 may receive the biometrics data as part of a registration process to register a user to be authenticated by one or more authentication servers 230.

The cognitive state determination module 620 may include a program module (e.g., program module 42 of FIG. 1) that determines the cognitive state of a user associated with a user device 210 that is requesting access to the client server 220, or as part of a registration of the user. In embodiments, the cognitive state may be based on the received biometrics data that indicates the user's mood, emotional state, etc. Additionally, or alternatively, the cognitive state may be based on user interactions between the user device 210 and the client server 220 (e.g., e-commerce shopping activity, browsing activity, etc.). Additionally, or alternatively, the cognitive state may be based on other suitable data or other suitable technique.

The non-invertible function application module 630 may include a program module (e.g., program module 42 of FIG. 1) that applies a non-invertible function to the biometrics data. In embodiments, the non-invertible function application module 630 may select a particular one of many non-invertible functions to apply based on the cognitive state of the user (e.g., as determined by the cognitive state determination module 620). In embodiments, the non-invertible function application module 630 may apply the non-invertible function to the biometrics data to scramble the biometrics data. Also, the non-invertible function application module 630 may combine the cognitive state data with the biometrics data, and scramble the combined data.

As described herein, the non-invertible function application module 630 may scramble the data using one or more techniques. For example, fingerprint data may be scrambled using a Cartesian scrambling technique, a polar scrambling technique, and/or a surface folding technique (e.g., as described in greater detail below with respect to FIGS. 9 through 11). Additionally, or alternatively, biometrics data may be scrambled using any other suitable technique.

The authentication module 640 may include a program module (e.g., program module 42 of FIG. 1) that receives the scrambled data (e.g., from the non-invertible function application module 630) and compares the scrambled data with pre-registered (e.g., previously registered and stored) scrambled data for the user. If the scrambled data matches, to a configurable threshold degree (e.g., to within a certain percentage match or other within another measure that may be defined via a user interface by an administrator of the authentication server 230), with the pre-registered scrambled data, the authentication module 640 may authenticate the user and provide an authentication message to the client server 220. If the data sets do not match, the authentication module 640 may query the user (e.g., by sending a message to the user device 210) for additional authentication information, or may simply deny access to the client server 220 by refraining from sending the authentication message from the client server 220.

The blockchain interface module 650 may include a program module (e.g., program module 42 of FIG. 1) that may maintain, access, and/or modify a blockchain. As described herein, the blockchain may store records that identify scrambled data for the user with which the authentication module 640 may compare for authentication. Also, data used to provide identity authentication may be collected at the time of authentication, along with any additional data around the user, such as user behavior, information regarding the client server 220, and/or any other interactions with the user verification process and interactions between the user device 210 and the client server 220. Such data may be be securely stored, and associated in aggregate to draw insights for future authenticating future users, and linking authentication to user experiences. Additionally, the data will be used to aid in classifying and better understanding the relationship between users' cognitive, emotional, and general mental state and interaction with sites and/or applications hosted by the client servers 220.

As described herein, an understanding of these associations may aid administrators of client servers 220 in providing a better experience to their users based on their immediate cognitive and emotional state, as well as provide more targeted insights and forecasting. This data and their associations may also be provided to third party applications for similar benefits, understanding, and improved insights and forecasting.

Figure 7:
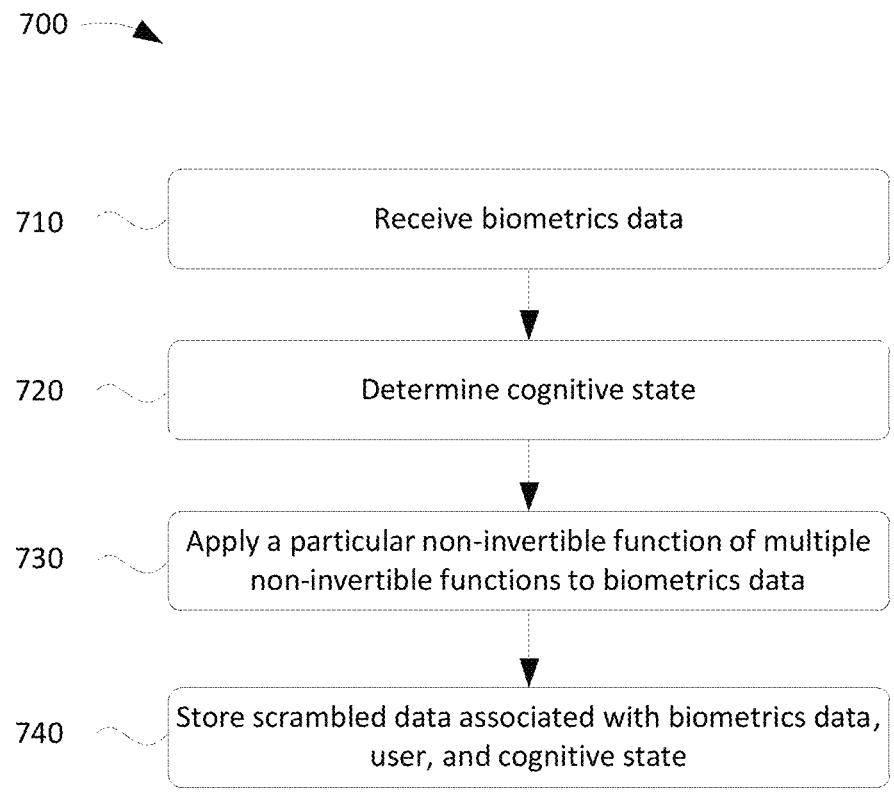
FIG. 7 shows an example flowchart of a process for registering a user for authentication via one or more authentication servers in accordance with aspects of the present invention.

FIG. 7 shows an example flowchart of a process for registering a user for authentication via one or more authentication servers in accordance with aspects of the present invention. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 may include receiving biometrics data (step 710). For example, as described above with respect to the biometrics data receiving module 610, the authentication server 230 may receive biometrics data from a user device 210 as part of a registration process to register a user to be authenticated by one or more authentication servers 230. In embodiments, the authentication server 230 may receive any suitable biometrics data, including, but not limited to, at least one of: fingerprint data, handprint data, retina data, facial imaging data, pulse rate information.

Process 700 may also include determining a cognitive state of the user (step 720). For example, as described above with respect to the cognitive state determination module 620, the authentication server 230 may determine the cognitive state of a user associated with the user device 210 that is registering for authentication services with the authentication server 230. In embodiments, the cognitive state may be based on the received biometrics data that indicates the user's mood, emotional state, etc. Additionally, or alternatively, the cognitive state may be based on user interactions between the user device 210 and a client server 220 (e.g., e-commerce shopping activity, browsing activity, etc.). Additionally, or alternatively, the cognitive state may be based on other suitable data or other suitable technique.

Process 700 may further include applying a particular non-invertible function, of multiple different non-invertible functions to the biometrics data (step 730). For example, as described above with respect to the non-invertible function application module 630, the authentication server 230 may select a particular one of many non-invertible functions to apply based on the cognitive state of the user (e.g., as determined by the cognitive state determination module 620). In embodiments, the authentication server 230 may apply the non-invertible function to the biometrics data to scramble the biometrics data. Also, the authentication server 230 may combine the cognitive state data with the biometrics data, and scramble the combined data.

Process 700 may also include storing the scrambled data associated with the biometrics data, user, and cognitive state data (step 740). For example, as described above with respect to the blockchain interface module 650, the authentication server 230 may store records that identify scrambled data for the user with which the authentication server 230 may later compare for authentication. In embodiments, the authentication server 230 may store the scrambled data as a blockchain transaction. Additionally, or alternatively, the authentication server 230 may store other data as blockchain transactions (e.g., the cognitive state data to link the cognitive state data with the scrambled biometrics data).

Figure 8:
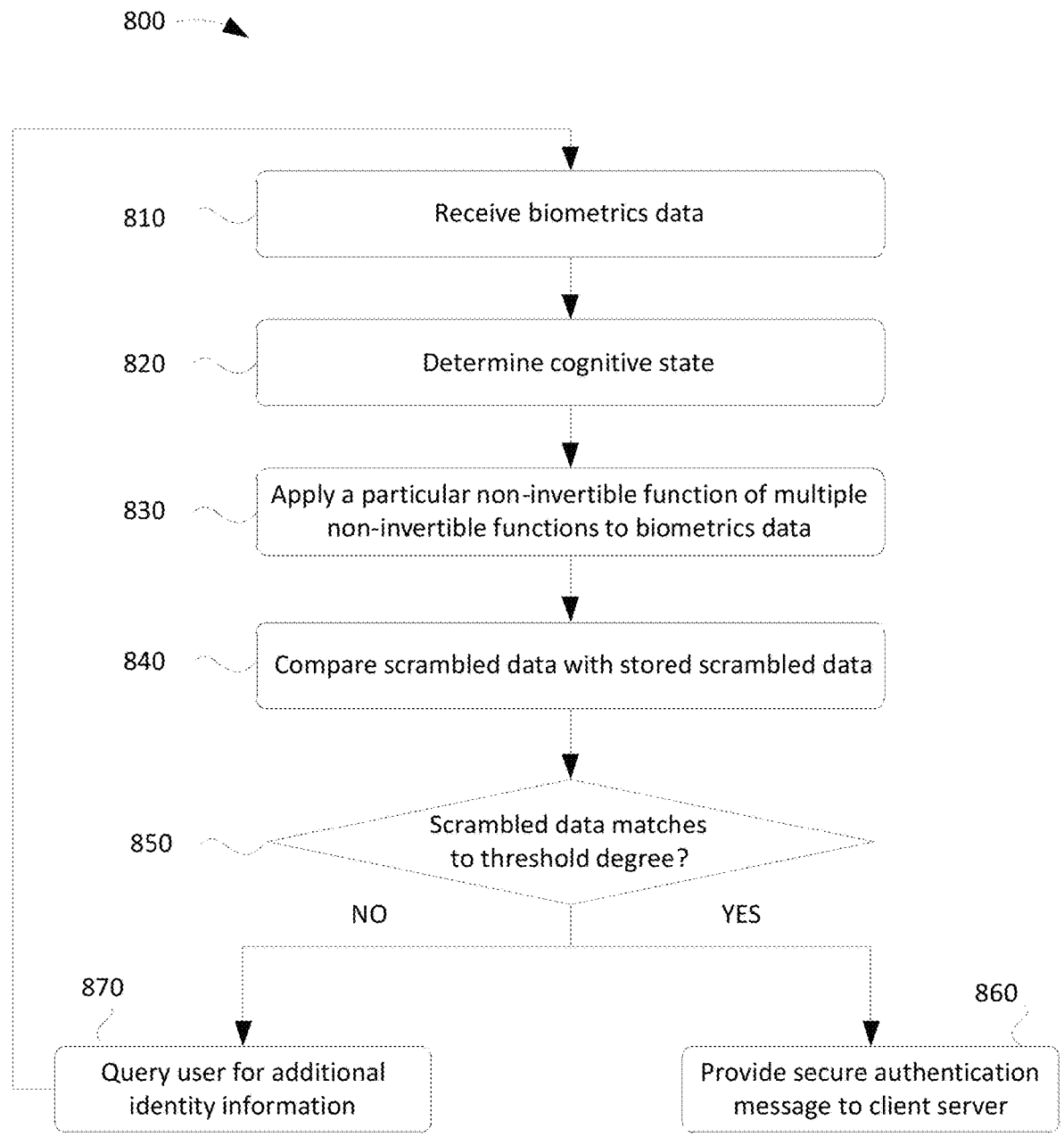
FIG. 8 shows an example flowchart of a process for authenticating a user to access a client server in accordance with aspects of the present invention.

FIG. 8 shows an example flowchart of a process for authenticating a user to access a client server in accordance with aspects of the present invention. The steps of FIG. 8 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 8, process 800 may include receiving biometrics data (step 810). For example, the authentication server 230 may receive biometrics data from a user device 210 as part of a request from a user of the user device 210 to access a client server 220. In embodiments, the authentication server 230 may receive suitable biometrics data, including, but not limited to, at least one of: fingerprint data, handprint data, retina data, facial imaging data, pulse rate information.

Process 800 may also include determining a cognitive state of the user (step 820). For example, as described above with respect to the cognitive state determination module 620, the authentication server 230 may determine the cognitive state of a user associated with the user device 210 that is requesting to access the client server 220. In embodiments, the authentication server 230 may determine the cognitive state in a similar manner as described above with respect to the cognitive state determination module 620 and process step 720 shown in FIG. 7.

Process 800 may further include applying a particular non-invertible function, of multiple different non-invertible functions to the biometrics data (step 830). For example, as described above with respect to the non-invertible function application module 630 and process step 730 of FIG. 7, the authentication server 230 may select a particular one of many non-invertible functions to apply based on the cognitive state of the user (e.g., as determined by the cognitive state determination module 620). In embodiments, the authentication server 230 may apply the non-invertible function to the biometrics data to scramble the biometrics data. Also, the authentication server 230 may combine the cognitive state data with the biometrics data, and scramble the combined data.

Process 800 may also include comparing the scrambled data with stored scrambled data (step 840). For example, as described above with respect to the authentication module 640, the authentication server 230 may compare the scrambled data with stored or a pre-registered version of the scrambled data for the user (e.g., scrambled data for the user that is record as a blockchain transaction).

If the scrambled data matches, to a configurable threshold degree, with the pre-registered version of the scrambled data (step 850—YES), the authentication server 230 may authenticate the user and provide an authentication message to the client server 220 (step 860). The client server 220 may then authorize the user device 210 to access the client server 220 via a secure session.

If the data sets do not match (step 850—NO), the authentication server 230 may query the user at step 870 (e.g., by sending a message to the user device 210) for additional authentication information (e.g., additional biometrics data such that process 800 returns to step 810). Alternatively, the authentication server 230 may simply deny access to the client server 220 by refraining from sending the authentication message from the client server 220 (e.g., if authentication has been attempted greater than a threshold number of times).

As described herein, the authentication server 230 may authenticate a user (or determine that an unauthorized user is not authenticated) based further on transactional information in the blockchain indicating an authorized user's habits, historical activity, etc. When a user attempts to authenticate their identity, the authentication server 230 may verify scrambled biometrics data, cognitive state data, and/or transaction data in the blockchain. In this way, user authentication may be more secure and is also less burdensome for the user since the user would not be required to remember different passwords for authentication to different client servers 220. Additionally, the authentication server 230 may classify the emotional or cognitive state for each blockchain transaction and associate the cognitive state with user experience on a client site hosted by a client server 220. In embodiments, non-invertible behavioral and biometrics data may be associated with each blockchain transaction. In this way, end-to-end data is captured for each transaction (e.g., user information, biometric and behavioral/cognitive state, client server 220 information, etc.). As described herein, blockchain technology, along with non-invertible functions, may be used to encrypt and manage the linkage between biometrics data, cognitive state data, and client site data.

Figure 9:
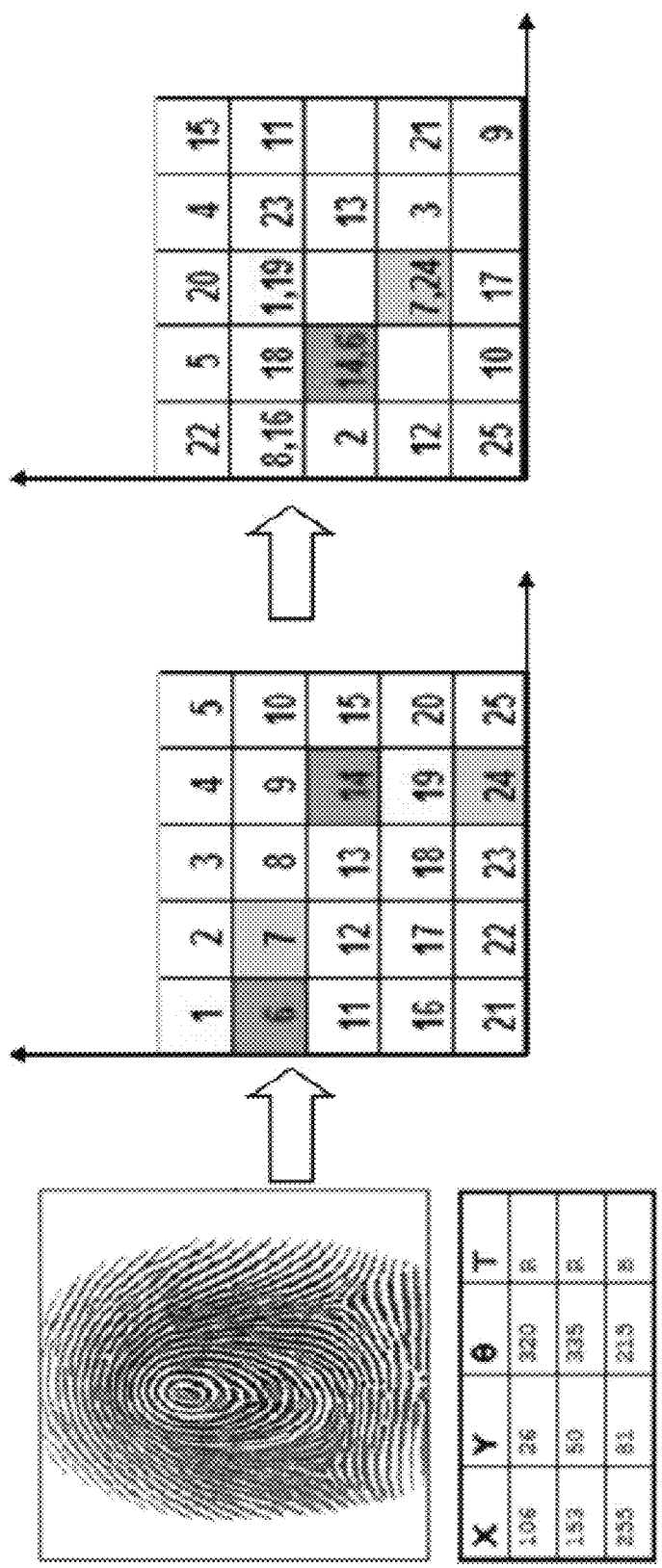
FIGS. 9-11 show examples for scrambling biometrics data in accordance with aspects of the present invention.
Figure 10:
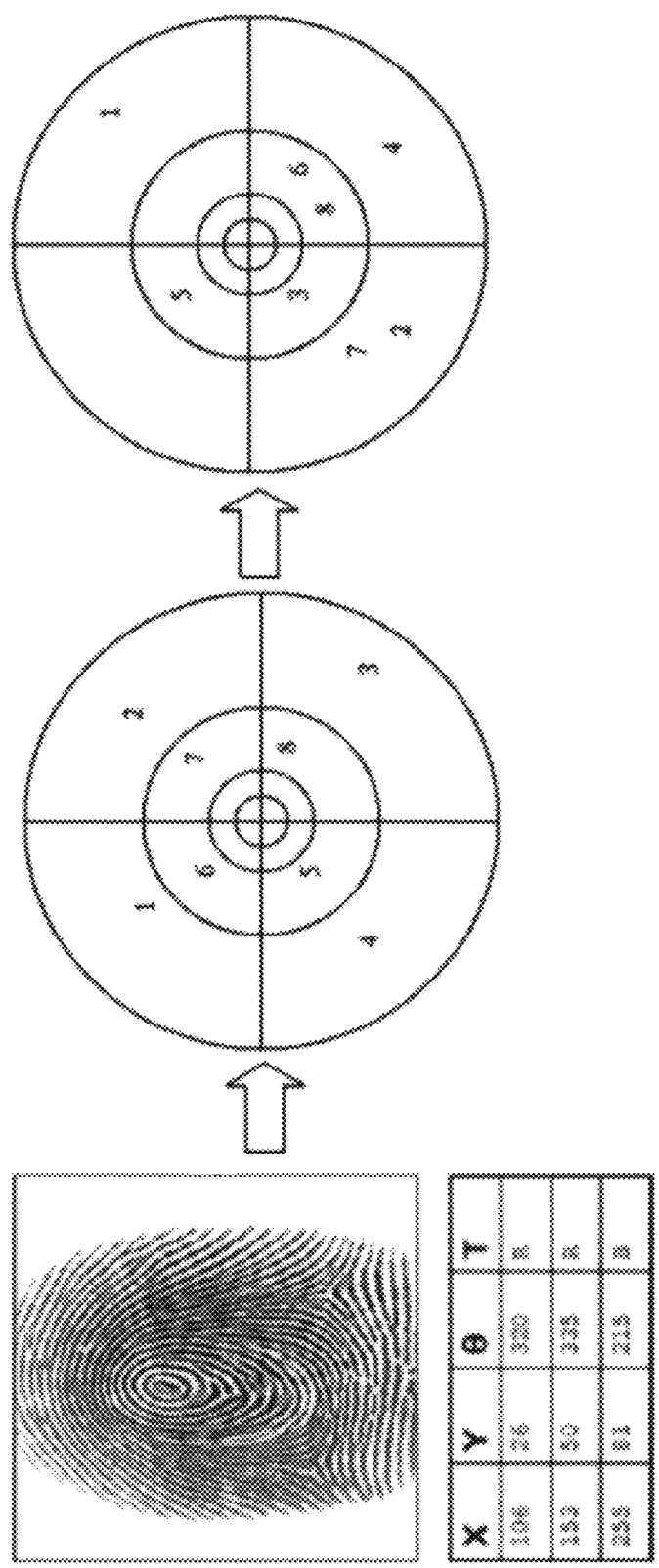
Figure 11:
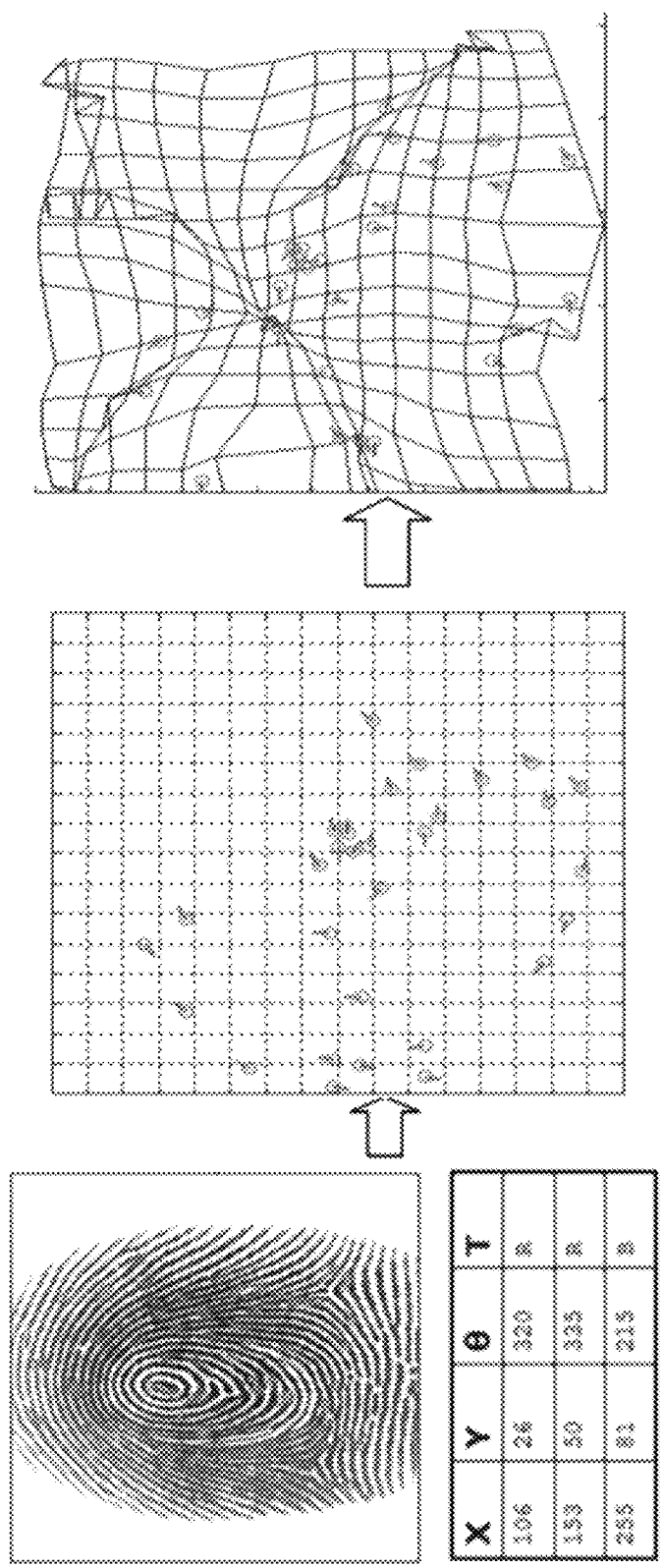

FIGS. 9-11 show examples for scrambling biometrics data in accordance with aspects of the present invention. In embodiments, the examples of FIGS. 9-11 may correspond to example techniniques for scrambling biometrics data by applying non-invertible functions to the biometrics data in accordance with process step 830 described in FIG. 8. As shown in FIG. 9, a Cartesian Scrambling may be used to scramble biometrics data (e.g., a fingerprint). For example, values for different coordinates may be assigned to a fingerprint based on the fingerprint pattern. The coordinates may be scrambled using any suitable randomization or scrambling algorithm, and the scrambled data may be stored and encrypted as a blockchain transaction in the blockchain ledger.

Referring to FIG. 10, polar scrambling may also be used to scramble biometrics data (e.g., fingerprint data). For example, values for different coordinates may be assigned to a fingerprint based on the fingerprint pattern, and the values may be assigned to a position on a circular graph. The position and/or values may be scrambled using any suitable randomization or scrambling algorithm, and the scrambled data may be stored and encrypted as a blockchain transaction in the blockchain ledger.

Referring to FIG. 11, surface folding may be used to scramble biometrics data (e.g., fingerprint data). For example, values for different coordinates may be assigned to a fingerprint based on the fingerprint pattern, and the values may be assigned to a position on surface graph. The position and/or values may be scrambled using any suitable randomization or scrambling algorithm, and the surface graph may be modified (e.g., "folded") based on the scrambled position and values. The scrambled or folded surface graph may be stored and encrypted as a blockchain transaction in the blockchain ledger.

In embodiments, other scrambling techniques may be used other than those shown in FIGS. 9-11. Also, other types of biometrics data may be scrambled (e.g., retina scan, facial imaging, pulse patterns, etc.). Cognitive state data may also be combined and scrambled with the biometrics data. For example, biometrics data may be converted into a hash or series of digits/characters, and scrambled along with the biometrics data.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a CPU, a computer readable memory and a computer readable storage medium associated with a computing device;
program instructions to receive biometrics data of a user via a user device as part of a request to access a secure device;
program instructions to determine a cognitive state of the user during the request to access the secure device to generate cognitive state data, wherein the cognitive state data is different than the biometrics data;
program instructions to apply a non-invertible function to the biometrics data to generate scrambled biometrics data, wherein the scrambled biometrics data includes the cognitive state data;
program instructions to determine whether the scrambled biometrics data matches a pre-registered version of the scrambled biometrics data stored as blockchain transactions in a blockchain; and
program instructions to provide an authentication message to the secure device requesting authentication of the user based on determining that the scrambled biometrics data matches the pre-registered version of the scrambled biometrics data;
wherein the program instructions are stored on the computer readable storage medium for execution by the CPU via the computer readable memory.

2. The system of claim 1, further comprising program instructions to select a particular non-invertible function of a plurality of non-invertible functions based on the cognitive state data, wherein the applying the non-invertible function is based on selecting the particular non-invertible function.

3. The system of claim 1, wherein the determining whether the scrambled biometrics data matches the pre-registered version of the scrambled biometrics data includes determining whether the scrambled biometrics data matches the pre-registered version of the scrambled biometrics data to a configurable threshold degree.

4. The system of claim 1, wherein the blockchain is maintained by a plurality of distributed authentication servers.

5. The system of claim 1, further comprising:
program instructions to receive registration biometrics data of the user via the user device as part of a registration request;
program instructions to apply the non-invertible function to the registration biometrics data to scramble the registration biometrics data and form the pre-registered version of the scrambled biometrics data; and
program instructions to store the pre-registered version of the scrambled biometrics data.

6. The system of claim 5, wherein the pre-registered version of the scrambled biometrics data is stored as a blockchain transaction in a blockchain.

7. The system of claim 1, wherein the secure device includes at least one selected from the group consisting of:
a client server; and
a physical device having computer network communications capabilities.

8. The system of claim 1, further comprising program instructions to derive the cognitive state data from the biometrics data, wherein the cognitive state data comprises at least one of: a mood of a user and an emotional state of a user.

9. A computer program product comprising a computer readable storage medium having program instructions embodied therewith, the program instructions executable by a computing device to cause the computing device to:
maintain a blockchain storing a pre-registered version of scrambled biometrics data for a user;
receive biometrics data of a user via a user device;
determine a cognitive state of the user to generate cognitive state data of the user, wherein the cognitive state data is different from the biometrics data;
scramble the biometrics data using a non-invertible function to generate scrambled biometrics data, wherein the scrambled biometrics data includes the cognitive state data;
determine whether the scrambled biometrics data matches the pre-registered version of the scrambled biometrics data stored as blockchain transactions in the blockchain; and
provide an authentication message to the secure device requesting authentication of the user based on determining that the scrambled biometrics data matches the pre-registered version of the scrambled biometrics data.

10. The computer-program product of claim 9, wherein the program instructions further cause the computing device to either deny access to the secure device or request additional authentication information based on determining that the scrambled biometrics data does not match the pre-registered version of the scrambled biometrics data.

11. The computer program product of claim 9, wherein the program instructions further cause the computing device to select a particular non-invertible function of a plurality of non-invertible functions based on the cognitive state data.

12. The computer program product of claim 9, wherein the determining whether the scrambled biometrics data matches the pre-registered version of the scrambled biometrics data includes determining whether the scrambled biometrics data matches the pre-registered version of the scrambled biometrics data to a configurable threshold degree.

13. The computer program product of claim 9, wherein the blockchain is maintained by a plurality of distributed authentication servers.

14. The computer program product of claim 9, wherein the scrambling the biometrics data includes using a scrambling technique selected from the group consisting of:
a Cartesian scrambling technique;
a polar scrambling technique; and
a surface folding scrambling technique.

15. The computer program product of claim 9, wherein the program instructions further cause the computing device to derive the cognitive state data from the biometrics data, wherein the cognitive state data comprises at least one of: a mood of a user and an emotional state of a user.

16. A computer-implemented method comprising:
receiving, by a computing device, biometrics data of a user via a user device;
determining, by the computing device, a cognitive state of the user to generate cognitive state data of the user, wherein the cognitive state data is different from the biometrics data;

scrambling, by the computing device, the biometrics data using a non-invertible function, wherein the non-invertible function is selected from a plurality of non-invertible functions based on the cognitive state data; and providing, by the computing device, an authentication message to a secure device requesting authentication of the user based on the scrambled biometrics data matching the pre-registered version of the scrambled biometrics data stored in a blockchain.

17. The computer-implemented method of claim 16, wherein the providing the authentication message provides a user of the user device with access to the secure device.

18. The computer-implemented method of claim 16, wherein the scrambling the biometrics data includes using a scrambling technique selected from the group consisting of:
    a Cartesian scrambling technique;
    a polar scrambling technique; and
    a surface folding scrambling technique.

19. The computer-implemented method of claim 16, further comprising deriving the cognitive state data from the biometrics data, wherein the cognitive state data comprises at least one of: a mood of a user and an emotional state of a user.

20. The computer-implemented method of claim 16, further comprising deriving the cognitive state data from a user interaction between the user device and the computing device.

\* \* \* \* \*